July 8, 1958     I. J. NELSON ET AL     2,842,012
SAW ADVANCE MEANS FOR AUTOMATIC SAW FILINGS
Filed March 29, 1957     2 Sheets-Sheet 1
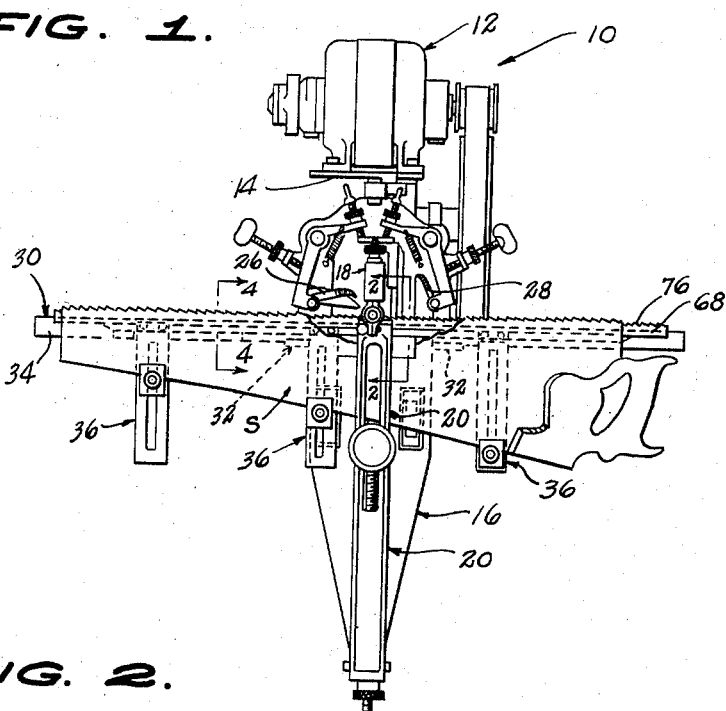
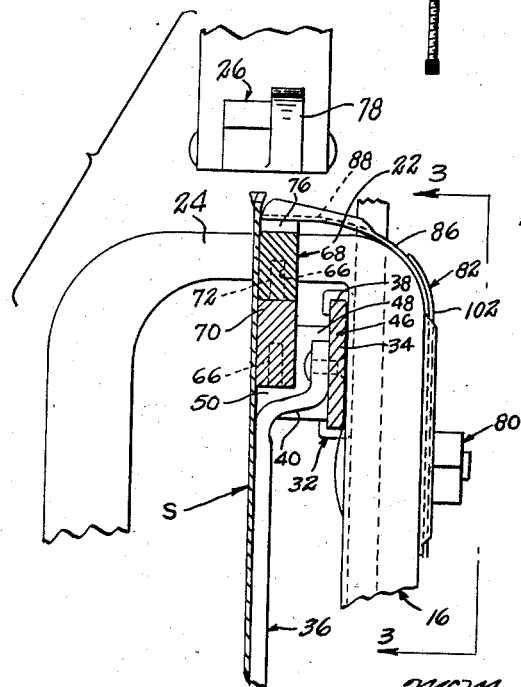
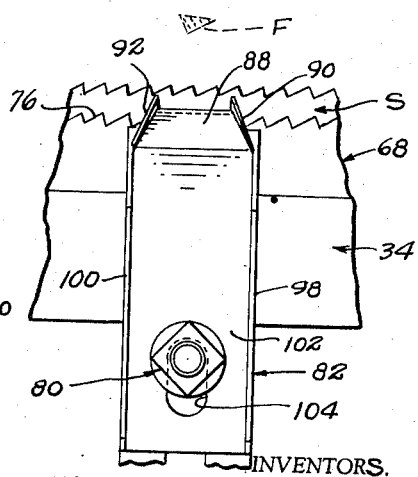
INVENTORS.
IVER J. NELSON,
ARLO R. NELSON,
BY
ATTORNEYS.

July 8, 1958     I. J. NELSON ET AL     2,842,012
SAW ADVANCE MEANS FOR AUTOMATIC SAW FILINGS
Filed March 29, 1957     2 Sheets-Sheet 2
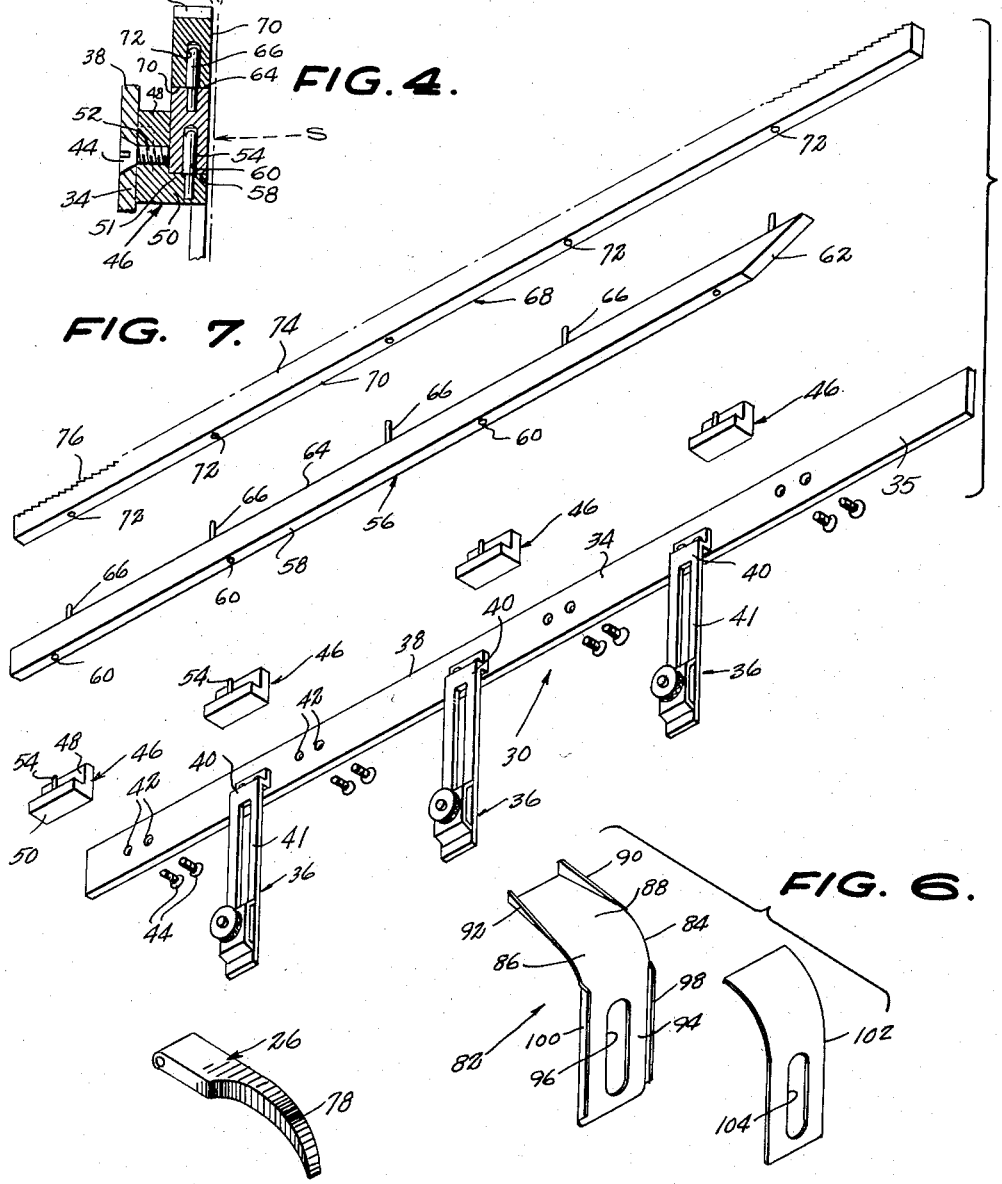
INVENTORS.
IVER J. NELSON,
ARLO B. NELSON,
BY
McMorrow, Berman + Davidson
ATTORNEYS.

United States Patent Office 2,842,012
Patented July 8, 1958

2,842,012
SAW ADVANCE MEANS FOR AUTOMATIC SAW FILINGS

Iver J. Nelson, Merrill, and Arlo R. Nelson, Rhinelander, Wis.

Application March 29, 1957, Serial No. 649,540

2 Claims. (Cl. 76—35)

This invention relates generally to automatic saw filing machines of the type disclosed in the expired patent to Collier, 1,674,853 of June 26, 1928, and is more particularly concerned with an improved saw blade carrier of the type disclosed in the expired patent to Collier, 1,728,393 of September 17, 1929.

Each of the above mentioned patents discloses an actuating dog sequentially engaging a preformed master tooth on a saw blade so that following teeth are automatically filed in relation to said master tooth. The machines of the above mentioned patents incorporate undesirable features not conducive to good saw filing technique. Further, use of a previously formed master tooth as a guide for filing following teeth often results in a lack of uniformity in the following teeth because of crowding of the file due to differences in the grain structure of the steel of the saw being filed. When a malformed master tooth is used as a guide, following teeth may be misspaced, so that a properly filed saw is not obtainable.

The primary object of the invention is to provide in a saw filing machine of the character indicated, a template bar having thereon accurately formed and spaced teeth or notches which are successively engaged by dog means of the saw advancing mechanism, the template bar being removably mounted on a support bar, which is in turn removably mounted on a guide bar which slides in a slideway and has thereon the saw clamping means, in such manner that need for a preformed master tooth on a saw blade is eliminated and more accurately formed and spaced teeth are filed on the saw blade.

Another object of the invention is to provide, in the above stated context, template bars which have teeth or notches of different forms and spacings, which are adapted to be used interchangeably in accordance with the type and spacings of teeth desired on saw blades filed in the machine.

A further object of the invention is to provide in a saw filing machine of the character indicated, a shield for catching and diverting saw filings as they are produced in a saw filing operation, so as to preclude clogging of the notches of the template bar and of immediately adjacent saw teeth by filings falling thereon.

A still further object of the invention is to provide the above outlined features in forms such that the same are readily applicable to conventional saw filing machines without substantial alterations of either said features or such machines.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a front elevation of an automatic saw filing machine incorporating the invention, a portion being broken away;

Figure 2 is an enlarged fragmentary vertical transverse section taken substantially on the plane of line 2—2 of Figure 1;

Figure 3 is a fragmentary side elevation looking substantially from the plane of line 3—3 of Figure 2;

Figure 4 is an enlarged fragmentary vertical transverse section taken substantially on the plane of line 4—4 of Figure 1, a portion of the saw blade on the machine being shown in phantom lines;

Figure 5 is an enlarged perspective view of one of the dog, the saw blade carrier advancing means of the machine;

Figure 6 is an enlarged exploded perspective view of a shield; and,

Figure 7 is an enlarged exploded perspective view of the saw blade carrier and a template bar associated therewith.

The type of automatic saw filing machines contemplated in the present invention have substantially the same component parts as and function in the same manner as the machine disclosed in the patent to Collier, 1,674,853, so that detailed description thereof herein is believed to be unnecessary. Further, the saw blade carrier of the present invention is basically the same as and functions in the same manner as the saw blade carrier shown in Figure 5 of the patent to Collier, 1,728,393.

Referring to the drawings in detail, there is shown an automatic saw filing machine of the character indicated above and indicated generally at 10, operated by an electric motor 12, mounted on a frame, indicated generally at 14. The frame 14 has a face plate, indicated generally at 18, and a vice assembly, indicated generally at 20. The vice assembly 20 has cooperating jaws 22 and 24, see Figure 2, and dogs 26 and 28 for automatically imparting step-by-step feeding movement to a saw S in a saw blade carrier, indicated generally at 30. The automatic saw filing machine 10 is suitably mounted upon a bench or the like (not shown).

The face plate 16 incorporates therealong a slideway, indicated generally at 32, serving to define the path of horizontal movement of the saw blade carrier 30 in the manner described in detail in the Collier Patent 1,728,393.

The saw blade carrier 30 comprises a horizontally elongated straight guide bar 34 reciprocably engaged in the slideway 32. The bar 34 has fixed on its side 35 longitudinally spaced depending clamp assemblies, indicated generally at 36, which can be similar to the clamp assemblies disclosed and described in detail in the Collier patent, 1,728,393, and shown in Figure 7 thereof. The clamp assemblies 36 are used, as clearly described in Patent 1,728,393 for retaining a saw blade S in a relatively fixed position on the saw blade carrier 30, the toothed edge of the saw blade to be filed being disposed in parallel relationship to the upper edge 38 of the guide bar 34 and above the same for engagement by the file F, as shown in phantom lines in Figure 3 herein.

The clamp assemblies 36 have upper portions 40 which act to offset the body portions 41 of the clamp assemblies from the related side 35 of the guide bar 34, and the upper portions 40 define thereabove a space for accommodating a template bar hereinafter described in detail.

The guide bar 34 is traversed by longitudinally spaced pairs of holes 42 which accommodate the threaded shanks of such as machine screws 44. Indicated at 46 are L-cross section blocks having vertical legs 48 and horizontal legs 50. The vertical legs 48, as shown in Figure 4, are traversed by pairs of threaded bores 52 receiving the threaded shanks of the machine screws 44. The vertical legs 48 are engaged with the side 35 of the guide bar 34, and the horizontal legs 50 terminate adjacent the plane defined by the saw blade S. The blocks 46 are secured in spaced longitudinal relationship along the bar 34 with the upper surfaces 51 of the legs 50 disposed in coplanar relationship.

Rising from the upper surfaces 51 of the legs 50 are suitably secured upstanding pins 54. Indicated generally at 56 is a horizontally elongated support bar having in its lower edge 58 a plurality of sockets 60 receiving therein the pins 54. The bar 56 has an upwardly beveled end 62 facilitating removal of the bar 56 from the blocks 46.

On the upper edge 64 of the bar 56 are longitudinally spaced suitably secured upstanding pins 66. Indicated generally at 68 is a horizontally elongated template bar having in its lower edge 70 longitudinally spaced sockets 72 receiving therein the pins 66 on the support bar 56. The bar 68 has on its upper edge 74 transverse notches 76 to be operatively engaged by dogs 26 or 28 for the purpose of producing step-by-step advance of the saw blade carrier 30. The template bar 68 constitutes one of a set of template bars, each of which has spacing notches 76 which are different from those of the other bars 68, corresponding to different numbers of saw blade teeth per inch.

The dog 26, for example, sequentially engages spacing notches 76 in response to reciprocable movement of the file F relative to the upwardly positioned toothed edge of a saw blade disposed in the saw blade carrier in the manner clearly set forth in the Collier patent, 1,674,853. It will be noted that the dog 26 incorporates an offset longitudinally extending finger 78 which is disposed in overlying coplanar relationship relative to the template bar 68.

As shown in Figure 2, the upper end of the jaw 22 is convexly curved, and has secured thereon by a nut and bolt assembly, indicated generally at 80, a shield, indicated generally at 82. The shield 82, as shown in Figure 6, comprises a substantially L-shaped body 84 including an intermediate arcuate bend 86 conforming to the convex upper end of the jaw 22, and a leg 88 having along its opposite side edges upstanding flanges 90 and 92. The other leg 94 has therein a longitudinally elongated slot 96 through which the bolt of the bolt assembly 80 extends. The leg 94 has along its opposite side edges outwardly extending lateral flanges 98 and 100 between which is disposed a clamping plate 102 having thereon a large longitudinally extending slot 104 which is registered with the slot 96. The bolt of the bolt assembly 80 extends also through the slot 104.

As clearly seen in Figures 2 and 3, the leg 88 of the shield 82 extends across and is spaced above the jaw 22 and the template bar 68, directly under the file F, see Figure 3, so that filings filed from the saw teeth will not be deposited in the spacing notches 76 of the template bar 68, but are caught by the shield. Additionally, the shield 82 protects the guide bar 34 from accumulation of filings thereon and in the slideway 32.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. A saw tooth filing machine comprising a face plate, a horizontal slideway extending along one side of said face plate, a guide bar sliding in said slideway, saw blade clamping means on and depending from said guide bar, said guide bar having an outer side, longitudinally spaced blocks secured to said outer side of the guide bar having horizontal legs, first upstanding pins on said horizontal legs, a support bar extending along said guide bar and resting upon said horizontal legs, said support bar having upper and lower edges, the lower edge of the support bar having therein sockets receiving the block pins, second upstanding pins on the upper edge of the support bar, a template bar extending along and resting upon said support bar and having upper and lower edges, sockets in the lower edge of the template bar receiving said second pins of the support bar, saw tooth indexing notches in the upper edge of said template bar, said support bar and said template bar having aligned outer saw blade engaging sides in line with said clamping means, said machine comprising saw blade advancing means and filing means overlying said template bar, said advancing means comprising a dog for engaging notches of said template bar.

2. A saw tooth filing machine according to claim 1, wherein a shield is mounted thereon and reaches above the space between said guide bar and said template bar and above said template bar in the region of the filing means to the outer side of the template bar so as to catch filings produced by the filing means and prevent filings from falling upon the indexing notches of the template bar and upon the guide bar and the slideway.

References Cited in the file of this patent

UNITED STATES PATENTS

| | | |
|---|---|---|
| 1,165,248 | Hanson | Dec. 21, 1915 |
| 1,224,293 | Foley | May 1, 1917 |
| 1,468,986 | Wilthil | Sept. 25, 1923 |
| 1,486,851 | Baldwin | Mar. 18, 1924 |
| 1,674,853 | Collier | June 26, 1928 |
| 1,728,393 | Collier | Sept. 17, 1929 |
| 2,310,517 | Collier | Feb. 9, 1943 |
| 2,427,412 | McCulley | Sept. 16, 1947 |
| 2,470,290 | Chryst | May 17, 1949 |
| 2,505,278 | Coghlan | Apr. 25, 1950 |
| 2,517,873 | Harrell | Aug. 8, 1950 |
| 2,519,748 | Duquette | Aug. 22, 1950 |